United States Patent [19]

Miyazaki et al.

[11] Patent Number: 4,965,036
[45] Date of Patent: Oct. 23, 1990

[54] METHOD OF LINING A PIPE WITH A TUBE INCLUDING PASSING HEATED FLUID THROUGH THE BORES OF THE TUBE

[75] Inventors: Yasuo Miyazaki, Osaka; Akira Kamide, Higashiosaka, both of Japan

[73] Assignee: Osaka Bousi Construction Co., Ltd., Osaka, Japan

[21] Appl. No.: 332,905

[22] Filed: Apr. 4, 1989

[30] Foreign Application Priority Data

Apr. 12, 1988 [JP] Japan ................................. 63-90771
Jun. 7, 1988 [JP] Japan ................................. 63-141178

[51] Int. Cl.$^5$ ............................................. B29C 63/34
[52] U.S. Cl. ............................. 264/269; 156/287; 156/294; 264/516; 264/573
[58] Field of Search ............... 156/287, 294; 264/269, 264/270, 515, 516, 573; 405/150, 154; 138/113, 114, 115, 117, 177; 428/35.7, 36.9, 36.91, 36.92

[56] References Cited

U.S. PATENT DOCUMENTS

| | | | |
|---|---|---|---|
| 79,220 | 6/1868 | Forsyth et al. | 156/287 |
| 3,996,967 | 12/1976 | Takada | 156/287 |
| 4,474,726 | 10/1984 | Ohta et al. | 264/516 |
| 4,585,371 | 4/1986 | Jones-Hinton | 405/150 |

FOREIGN PATENT DOCUMENTS

| | | | |
|---|---|---|---|
| 2343957 | 10/1977 | France . | |
| 0075281 | 7/1978 | Japan | 156/294 |
| 0148071 | 11/1979 | Japan | 156/294 |
| 0055223 | 5/1981 | Japan | 264/573 |
| 57-154581 | 9/1982 | Japan . | |
| 58-24679 | 2/1983 | Japan . | |
| 58-88281 | 5/1983 | Japan . | |
| 1205117 | 9/1986 | Japan | 264/516 |
| 0053376 | 9/1987 | PCT Int'l Appl. | 264/269 |

*Primary Examiner*—Michael W. Ball
*Assistant Examiner*—Steven D. Maki
*Attorney, Agent, or Firm*—Armstrong, Nikaido, Marmelstein, Kubovcik & Murray

[57] ABSTRACT

The present invention is for a method of lining a pipe with a rigid to semirigid plastic tube which is inserted through the pipe by inflating the tube by application of heat and pressure. The method is characterized in that the tube has a large wall thickness and is formed with a multiplicity of bores extending through the tube wall axially thereof and arranged in parallel at a spacing circumferentially of the tube. The tube is heated by passing a heating fluid through the bores. The tube having the large wall thickness can be uniformly heated throughout the entire wall thickness so as to be inflated fully by the application of pressure, free of the likelihood of insufficient inflation or rupture and to line the pipe.

5 Claims, 1 Drawing Sheet

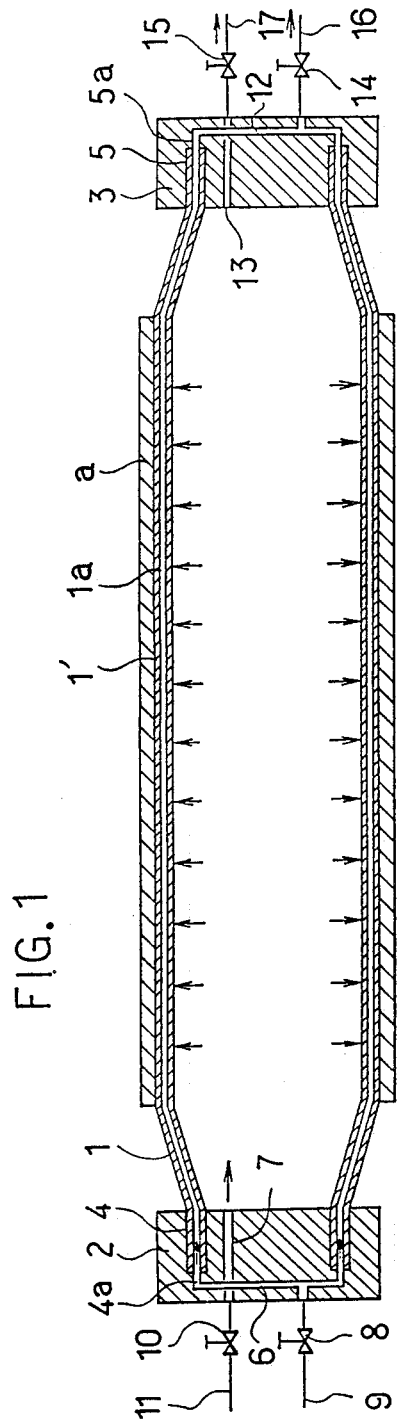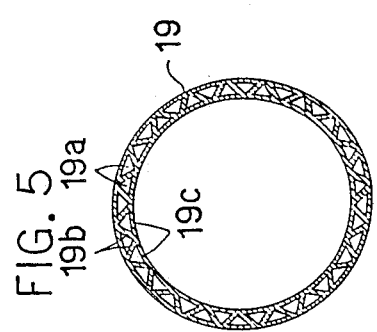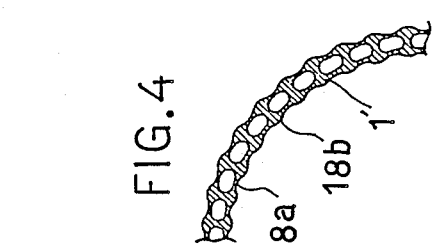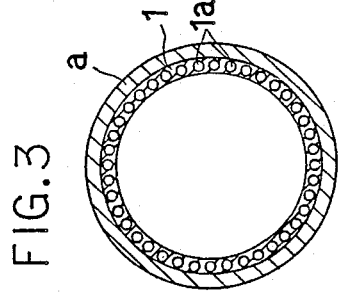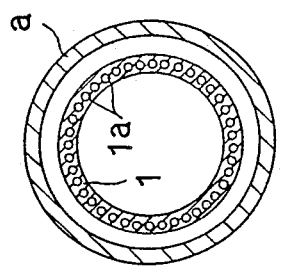

METHOD OF LINING A PIPE WITH A TUBE INCLUDING PASSING HEATED FLUID THROUGH THE BORES OF THE TUBE

TECHNICAL FIELD

The present invention relates to a method of lining pipes with a rigid tube, and more particularly to a method of forming a rigid tube lining on the inner surface of a pipe having a relatively large diameter, such as a water supply main pipe, town gas main pipe and sewer main pipe, using a rigid plastic tube having a relatively large wall thickness.

BACKGROUND ART

Methods of lining pipes have already been proposed wherein a rigid plastic tube inserted through the pipe is inflated radially of the pipe by applying heat and pressure to the tube from inside to thereby line the pipe with the tube (see, for example, Unexamined Japanese Patent Publication No. 88281/1983).

The rigid tube lining formed by the above method is hard, therefore retains itself in the pipe lining state and is better in quality than the soft tube lining which is bonded with an adhesive to the pipe for lining.

With the rigid tube lining method, the rigid plastic tube inserted through the pipe is softened by heating before the pressure inflation step so as to be inflatable by application of pressure.

To soften the rigid plastic tube by heating, it is proposed to use a heating fluid such as steam to the inside of the tube. The heating fluid serving as the softening means is advantageous over a heating jig having an electric heater incorporated therein in that the tube can be heated and softened more easily in respect of the device and procedure needed.

The heating fluid serving as for heating-softening means poses no particular problem insofar as the rigid plastic tube to be treated has a relatively small wall thickness. However, problems arise when this means is used for heating and softening tubes having a relatively large wall thickness, e.g. about 5 to about 20 mm, for use in lining pipes, such as water supply mains, having a relatively large diameter, e.g. about 200 to about 800 mm. When the inner peripheral portion of the tube heated by direct contact with the heating fluid is compared with the outer peripheral portion thereof which is not in direct contact with the fluid, the outer peripheral portion is softened noticeably less effectively than the inner peripheral portion. This is attributable to low heat conductivity of the plastic and also to the release of heat from the outer periphery. The difference in the softened state between the inner peripheral portion and the outer peripheral portion leads to insufficient inflation, rupture or similar problems when the tube is inflated by application of pressure.

To compensate for the insufficient heating of the tube outer peripheral portion in this case, it appears useful to heat the tube from outside in addition to heating from inside, but this is not very effective due to marked dissipation of heat from the tube toward the pipe to be lined.

DISCLOSURE OF THE INVENTION

The main object of the present invention is to provide a method of lining pipes with a rigid plastic tube having a large wall thickness by heating and softening the tube, as inserted through the pipe, substantially uniformly throughout the entire wall thickness so that the tube can be inflated by application of pressure fully and properly free of the likelihood of insufficient inflation, rupture or like trouble.

Other features of the present invention will become apparent from the following description.

The present invention provides a method of lining a pipe with a rigid to semirigid plastic tube inserted through the pipe by inflating the tube by application of heat and pressure, the method being characterized in that the tube has a large wall thickness and is formed with a multiplicity of bores extending through the tube wall axially thereof and arranged in parallel at a spacing circumferentially of the tube, the tube being heated by passing a heating fluid through the bores.

The method of the invention is used for lining pipes, such as water supply mains, town gas mains and sewer mains, having a relatively large diameter, for example, of about 200 to about 800 mm. The lining material to be used is a rigid to semirigid plastic tube having a relatively large wall thickness, for example, of about 5 to about 20 mm.

The rigid to semirigid plastic tube, which needs to be softened by heating, must be thermoplastic. To be heatable with a heating fluid, the tube has a relatively low softening point, for example, of about 60° to about 100° C., preferably about 70° to about 95° C. Examples of useful plastics having such a lower softening point are polyvinylchloride, polyethylene, polypropylene and the like.

The rigid plastic tube, which needs to be inserted through the pipe to be lined, has an outside diameter which is smaller than the inside diameter of the pipe and which usually corresponds to about 50 to about 90% of the inside diameter of the pipe. Preferably, the tube is similar to the pipe in cross sectional form and is generally circular in cross section.

The rigid plastic tube is formed with a multiplicity of bores extending through the tube wall axially thereof and arranged in parallel at a spacing circumferentially of the tube. Preferably, these bores are arranged on a circle concentric with the tube and positioned centrally of the tube wall thickness.

In cross section, the bores have a desired form, such as a circular, triangular or square form. When triangular, the bores can be arranged in parallel as oriented alternately in opposite directions in cross section.

Preferably, the total opening area of the bores occupies about 20 to about 50% of the total cross sectional area of the tube. The opening area, if larger than this range, is undesirable in view of the strength of the tube, whereas smaller opening areas are not favorable for heating the tube. In view of the possible adverse effect on the strength of the tube, the diameter of the bores is suitably determined from the range of about 40 to about 70% of the wall thickness of the tube. The spacing between the bores, if excessively large, is undesirable for heating, whereas too small a spacing is likely to entail an undesirable result with respect to strength. Preferably, the spacing is smaller than the tube wall thickness. Usually, it is in the range of about 50 to about 100% of the tube wall thickness, as suitably determined.

Rigid plastic tubes having such bores extending through the wall thereof are prepared by production techniques disclosed, for example, in Examined Japanese Patent Publications No. 7052/1982, No. 18333/1987, etc.

The bored rigid plastic tube, which is diametrically smaller than the pipe to be lined, is inserted through the pipe over the entire length thereof before the lining operation.

Next, the tube is heated by passing a heating fluid through the bores.

While various heating fluids such as steam and heated air are usable for heating, steam is especially suited to use since steam has a large heat capacity, becomes pure water on condensation, will not soil the tube and is unlikely to entail pollution if discharged as it is.

If the heating fluid flowing through the bores has an excessively high pressure, the tube is likely to inflate locally around the bore, so that the pressure of the heating fluid is preferably in the range of about 0 to about 2.0 kg/cm$^2$ (gauge pressure).

Since the heating fluid flowing through the bores heats the tube from the interior of the tube wall, the wall is readily heated in its entirety. Further with the dissipation of thermal energy from the tube inhibited, the tube can be heated efficiently. Consequently, the tube wall can be heated and softened uniformly in its entirety within a relatively short period of time although having a large thickness.

In order to enable the tube to retain its shape during the heating-softening step, the inside of the tube can be maintained at a pressure, for example, of about 0 to about 0.5 kg/cm$^2$ (gauge pressure) which will not inflate the tube. In this case, a heating fluid, such as air preheated to about 50° to about 100° C, may be used as the fluid for assuring shape retentivity so as to heat the tube from inside in addition to heating from inside the bores.

After the tube has been softened by heating, a pressure fluid is supplied to the interior of the tube, preferably with continued heating from inside the bores. The kind of pressure fluid is not limited specifically. Usually compressed air is used as the pressure fluid. The compressed air supplied to the interior of the tube applies pressure to the tube from inside, inflating the tube to form a rigid tube lining on the inner surface of the pipe.

The pressure of compressed air is in such a range that the air is capable of inflating the tube. Satisfactory results can be achieved generally at a pressure of about 0.5 to about 2.0 kg/cm$^2$ (gauge pressure). The compressed air may be used as heated to about 50° to about 100° C.

Since the tube is thus inflated by the application of pressure after it has been softened uniformly by heating, the tube can be inflated free of troubles such as insufficient inflation and rupture.

After the inflation, the tube is solidified by cooling with the interior of the tube held pressurized, whereby the whole work is completed. The tube may be cooled by passing a cooling fluid, such as water or air, through the bores.

The method of the present invention is adapted to efficiently line pipes with a rigid plastic tube having a relatively large wall thickness without developing problems.

BRIEF DESCRIPTION OF THE DRAWINGS

FIG. 1 is a view in vertical section schematically showing a mode of practicing the method of the invention;

FIG. 2 is a view in vertical section of the tube shown in FIG. 1 before it is inflated;

FIG. 3 is a view in vertical section showing the tube as inflated;

FIG. 4 is a fragmentary view in vertical section showing the lining formed on an enlarged scale; and FIG. 5 is a view in vertical section showing another example of preferred rigid plastic tube for use in the method of the invention.

BEST MODE OF CARRYING OUT THE INVENTION

A mode of practicing the method of the invention will be described with reference to the accompanying FIGS. 1 to 3 show the present method as practiced using a rigid plastic tube 1 having a relatively large wall thickness and formed with a multiplicity of bores 1a extending through the tube wall and having a circular cross section. As seen in FIG. 2, the rigid tube has a smaller diameter than the pipe a to be lined and a relatively large wall thickness.

Before lining, the rigid tube 1, which is smaller than the pipe a in diameter, is inserted through the pipe a over the entire length thereof, and the tube 1 is then closed at its opposite ends with a front closure 2 and a rear closure 3.

The front closure 2 and the rear closure 3 have in their inner surfaces annular furrows 4 and 5, respectively, in which the respective ends of the tube 1 are fixedly fitted. These furrows 4, 5 have in their bottoms grooves 4a, 5a. The bores 1a extending through the wall of the tube 1 are opened at their opposite ends to the interior of the grooves 4a, 5a.

The front closure 2 is formed with a channel 6 for supplying a heating fluid, such as steam, to the bores 1a via the groove 4a in the annular furrow 4, and has a channel 7 for supplying a pressure fluid, such as compressed air, to the interior of the tube 1. The inlet of the former channel 6 communicates with a boiler (not shown) through a conduit 9 having a valve 8. The inlet of the latter channel 7 is in communication with a compressor (not shown) via a conduit 11 having a valve 10.

The rear closure 3 has a channel 12 for discharging steam from the bores 1a through the groove 5a, and a channel 13 for discharging compressed air from the tube 1. The outlets of the channels 12, 13 are respectively provided with conduits 16, 17 having valves 14, 15, respectively.

To practice the present method, steam is supplied to the bores 1a in the wall of the tube 1 through the steam supply system, i.e., through the conduit 9, the channel 6 and the groove 4a. The steam flows through the bores 1a while heating the tube 1 from inside its wall and is discharged to the outside through the discharge system, i.e., through the groove 5a, the channel 12 and the conduit 16. Although the tube 1 is heated with steam in this way usually at atmospheric pressure, the steam may be applied at a low pressure which will not inflate the wall around the bores 1a, for example, at a slightly elevated pressure of about 0.5 kg/cm$^2$ (gauge pressure) when so desired. Further in addition to continued heating with steam through the bores 1a, the tube 1 may be heated from inside utilizing the compressed air supply system.

Since the tube 1 is heated from inside the bores 1a, i.e. from inside the tube wall, the wall can be heated substantially uniformly throughout its entire thickness although the wall is thick.

After the inner and outer surfaces of the tube 1 have been heated to a temperature not lower than the softening point of the tube (but not exceeding the melting point thereof), compressed air which is preferably preheated to about 80° to about 100° C. is fed to the interior of the tube 1 through the air supply system, i.e. through the conduit 11 and the channel 7, while continuously heating the tube from inside the bores 1a. When the internal pressure of the tube 1 is raised to a level required for inflating the tube, for example, to about 0.5 to about 2.0 kg/cm² (gauge pressure), the rigid tube 1 is inflated to line the pipe a. The lining thus formed is shown in FIGS. 1 and 3. Since the tube 1 is heated to a uniform temperature throughout its wall thickness as already stated, the tube can be inflated into the lining uniformly over the entire length thereof free of the likelihood of rupture or the like although having a large wall thickness.

After the tube 1 has been inflated with application of heat and pressure by the procedure illustrated in FIG. 1, heating with steam is discontinued, and the tube is solidified by cooling with compressed air, whereby a rigid tube lining 1' is obtained with a large wall thickness.

The rigid tube lining 1' obtained by the method shown in FIGS. 1 to 3 was checked for surface smoothness. As shown as exaggerated in the enlarged sectional view of FIG. 4, the lining was found to have slight surface irregularities including recesses 18a adjacent to the bores 1a and protuberances 18b adjacent to the solid wall portions between the bores. The surface smoothness of the rigid tube lining 1' can be improved by using a rigid plastic tube 19 having the structure shown in cross section in FIG. 5.

The rigid tube 19 shown in FIG. 5 differs in structure from the rigid tube 1 of FIGS. 1 to 3 in that the tube 19 has bores 19a having a triangular cross section and arranged in parallel as oriented in opposite directions alternately. The partitions 19b, 19b defining the oblique sides of the triangular bore 19a are approximately equal in thickness to the base wall 19c defining the base side of the bore 19a, such that the . ratio between the void portion and the solid portion is approximately uniform at any diametrical section. When subjected to the inflating pressure from inside, any peripheral portion of the tube wall about the center of the tube similarly acts against the pressure, with the result that the tube is uniformly inflated in its entirety to give a smooth-surfaced lining.

To further clarify the features of the method of the present invention, experiments were conducted according to the method as described below.

EXPERIMENTAL EXAMPLE 1

| (I) Experimental conditions | | |
| --- | --- | --- |
| i. Pipe to be lined | | |
| | Inside diameter | 250 mm |
| | Length | 50 m |
| ii. Rigid plastic tube | | |
| | Material | polyvinyl chloride |
| | Outside diameter | 200 mm |
| | Wall thickness | 10 mm |
| | Softening point | 72° C. |
| iii. Bores | | |
| | Cross sectional form | circular |
| | Diameter | 6 mm |
| | Spacing between bores | 9 mm |
| | Number | 66 |
| | Total opening area | 28% of tube cross sectional area |
| | Position | centrally of tube wall thickness |
| iv. Heating fluid | | |
| | Kind | steam |
| | Supply rate | 100 kg/hour |
| | Supply pressure | 0.3–0.5 kg/cm² (gauge) |
| | Duration of supply | 5 min |

-continued

| (I) Experimental conditions | | |
| --- | --- | --- |
| | Heating condition | to the bores only |
| v. Pressure fluid | | |
| | Kind | compressed air |
| | Temperature | 20° C. |
| | Supply pressure | 0.5 kg/cm² (gauge) |
| | Inflation period | about 3 min |
| | Cooling period | about 30 min |

When the present method was practiced in the mode shown in FIG. 1 under the above experimental conditions, a lining was obtained which had a good quality like the rigid tube lining 1' shown in FIG. 3. The ambient atmosphere of the pipe a was maintained at ordinary temperature (18° C.).

EXPERIMENTAL EXAMPLE 2

The present method was practiced under the same experimental conditions as in Example 1 with the exception of using rigid plastic tubes of polyethylene or polypropylene. The results achieved were satisfactory and comparable to the result achieved in Example 1.

EXPERIMENTAL EXAMPLE 3

The present method was practiced under the same experimental conditions as in Example 1 with the exception of using a rigid plastic tube having the cross sectional structure of FIG. 5, whereby a smooth-surfaced rigid tube lining was obtained. The conditions relating to the bores in the tube were as follows.

| | |
| --- | --- |
| Cross sectional form | regular triangle |
| Length of each side | 12 mm |
| Thickness of partitions | 2.5 mm |
| Total opening area | 38% of tube cross sectional area |

We claim:

1. A method of lining a pipe with a plastic tube, the tube being one of a rigid plastic tube or a semirigid plastic tube, said tube having a large wall thickness and is formed with a multiplicity of bores extending through the tube wall axially thereof and arranged in parallel at a spacing circumferentially of the tube, said method of lining a pipe comprising the steps of:
 inserting the tube through the pipe;
 passing a heating fluid through the bores of said tube;
 heating said tube from inside said walls of the tube with said heating fluid until said tube is softened; and
 pressurizing an interior of the tube to inflate the tube to uniformly line the pipe while continuing to heat the tube with the heating fluid in the bores of the tube.

2. The lining method as defined in claim 11 wherein the rigid plastic tube has a softening point of about 60 to about 100° C., and the heating fluid to be passed through the bores is steam.

3. The A lining method as defined in claim 11 wherein the tube is a rigid plastic tube and the rigid plastic tube is heated from both inside the interior of the tube and inside the bores by passing the heating fluid through the tube and through the bores.

4. The lining method as defined in claim 3 wherein the heating fluid to be passed through the tube is heated air, and the heating fluid to be passed through the bores is steam.

5. The lining method as defined in claim 11 wherein the tube is a rigid plastic tube and the rigid plastic tube has the wall thickness of about 5 to about 20 mm, the bores being arranged on a circle concentric with the tube and positioned centrally of the tube wall thickness.

* * * * *

UNITED STATES PATENT AND TRADEMARK OFFICE
CERTIFICATE OF CORRECTION

PATENT NO. : 4,965,036

DATED : October 23, 1990

INVENTOR(S) : Yasuo MIYAZAKI et al.

It is certified that error appears in the above-identified patent and that said Letters Patent is hereby corrected as shown below:

On the cover page, Item [73], "Osaka Bousi Construction Co., Ltd." should read --Osaka Bousui Construction Co., Ltd.--

Signed and Sealed this

Fifth Day of May, 1992

Attest:

DOUGLAS B. COMER

Attesting Officer

Acting Commissioner of Patents and Trademarks